(12) United States Patent
Fu et al.

(10) Patent No.: US 11,386,595 B2
(45) Date of Patent: Jul. 12, 2022

(54) METHOD FOR RECONSTRUCTING INCOMPLETE DATA OF X-RAY ABSORPTION CONTRAST COMPUTED TOMOGRAPHY BASED ON DEEP LEARNING

(71) Applicants: Beihang University, Beijing (CN); Jiangxi Research Institute of Beihang University, Jiangxi (CN)

(72) Inventors: Jian Fu, Beijing (CN); Jianbing Dong, Beijing (CN); Changsheng Zhang, Beijing (CN)

(73) Assignees: Beihang University, Beijing (CN); Jiangxi Research Institute of Beihang University, Jiangxi (CN)

( * ) Notice: Subject to any disclaimer, the term of this patent is extended or adjusted under 35 U.S.C. 154(b) by 175 days.

(21) Appl. No.: 17/031,096

(22) Filed: Sep. 24, 2020

(65) Prior Publication Data
US 2021/0118204 A1    Apr. 22, 2021

(30) Foreign Application Priority Data

Oct. 18, 2019   (CN) .......................... 201910991991.7

(51) Int. Cl.
*G01N 23/00*    (2006.01)
*G06K 9/00*    (2022.01)
(Continued)

(52) U.S. Cl.
CPC .......... *G06T 11/006* (2013.01); *G01N 23/046* (2013.01); *G01N 23/083* (2013.01);
(Continued)

(58) Field of Classification Search
CPC .............. G01N 23/083; G01N 23/046; G01N 2223/401; G01N 2223/41; G06T 11/008;
(Continued)

(56) References Cited

U.S. PATENT DOCUMENTS 7,865,227 B2 *  1/2011  Mistretta .......... G01R 33/56308
                                               600/428
8,768,045 B2 *  7/2014  Rohkohl ............... G06T 11/005
                                                378/97
(Continued)

OTHER PUBLICATIONS

Gordon, et al., "Algebraic Reconstruction Techniques (ART) for Three-dimensional Electron Microscopy and X-ray Photography", J. theor. Biol., 29, 1970, pp. 471-481.
(Continued)

*Primary Examiner* — Irakli Kiknadze
(74) *Attorney, Agent, or Firm* — Dorsey & Whitney LLP

(57) ABSTRACT

The present invention discloses a method for reconstructing incomplete data of X-ray absorption contrast computed tomography (CT) based on deep learning (DL). The method includes the following steps: using a filtered back projection (FBP) algorithm to obtain an initial reconstructed image; forward projecting the initial reconstructed image to obtain artifact-contaminated complete projection sequences; using a DL technique to process the artifact-contaminated projection sequences to obtain artifact-free projection sequences; using the FBP algorithm to reconstruct the artifact-free projection sequences to obtain a final reconstructed image. Compared with the traditional incomplete data reconstruction methods, the examples of the present invention feature a simpler calculation process, fewer parameters to be manually set, a faster calculation speed and higher image quality.

6 Claims, 3 Drawing Sheets

(51) Int. Cl.
*G06T 11/00* (2006.01)
*G01N 23/046* (2018.01)
*G01N 23/083* (2018.01)

(52) U.S. Cl.
CPC ...... *G06T 11/008* (2013.01); *G01N 2223/401* (2013.01); *G06T 2211/421* (2013.01)

(58) Field of Classification Search
CPC ............. G06T 11/006; G06T 2211/436; G06T 2211/421; G06T 5/50; G06T 2211/424; G06T 2207/20224; G06T 2207/10116; G06T 2207/30004; G06T 2207/20084; G06T 2207/20081; G06T 11/005; G06T 19/00; G06T 7/11; G06T 2210/41; G06T 2211/412; G06T 5/002; G06T 7/0012; G06T 2207/10004; G06T 2207/10104; G06T 5/20; G06T 7/0014; G06T 2207/10072; G06T 2207/20004; G06T 2207/10081; G06T 5/003; G06T 11/003; A61B 6/03; A61B 6/5258; A61B 6/12; A61B 6/541; A61B 6/503; A61B 5/7257; A61B 6/037; A61B 6/032; A61B 6/584; G01R 33/5619; G01R 33/5608; G01R 33/5673; G01R 33/4835; G06N 3/08; G06N 3/084; G06N 3/0454; G06N 3/04; G06N 20/00; G06V 30/194; G06V 10/30; G06V 2201/03; G06K 9/6256; G06K 9/0051; G01T 1/17; G01T 1/161; G16H 50/20; G16H 30/40
USPC .......................... 378/4, 19, 62; 382/131, 132
See application file for complete search history.

(56) References Cited

U.S. PATENT DOCUMENTS

| | | | |
|---|---|---|---|
| 11,308,664 B2* | 4/2022 | Manhart | G06T 11/008 |
| 2019/0206095 A1* | 7/2019 | Xing | G06N 3/084 |
| 2020/0027254 A1* | 1/2020 | Chang | G06T 11/006 |
| 2021/0007702 A1* | 1/2021 | Lee | A61B 6/584 |
| 2021/0375010 A1* | 12/2021 | Soons | G06T 11/006 |

OTHER PUBLICATIONS

Jin, et al., "Deep Convolutional Neural Network for Inverse Problems in Imaging", IEEE Transactions on Image Processing, vol. 26, No. 9, Sep. 2017, pp. 4509-4522.

Sidky, et al., "Image reconstruction in circular cone-beam computed tomography by constrained, total-variation minimization", Phys Med Biol, 53(17): 4777-4807. doi:10.1088/0031-9155/53/17/021, Sep. 7, 2008, 41 pages.

* cited by examiner

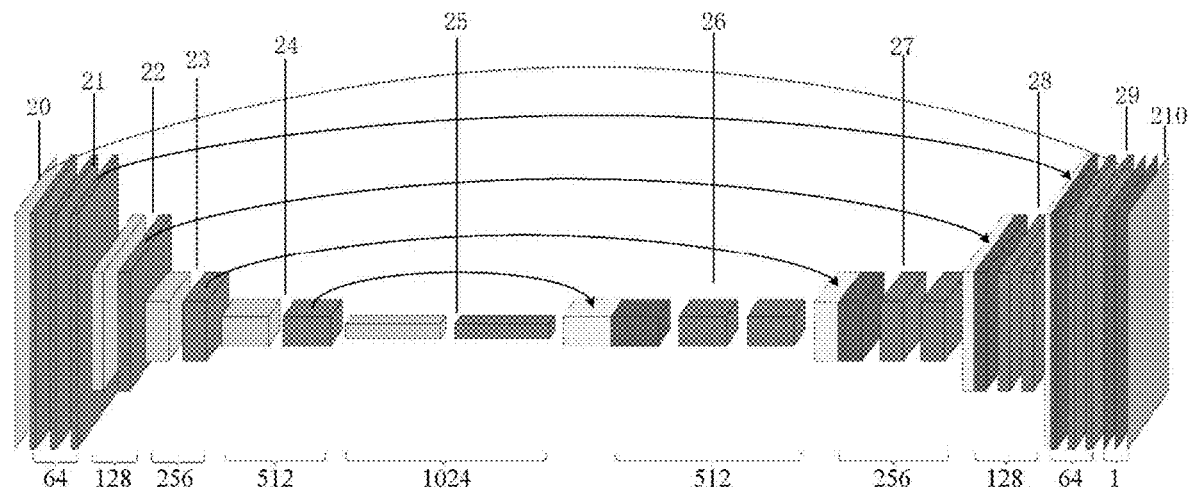
FIG. 2
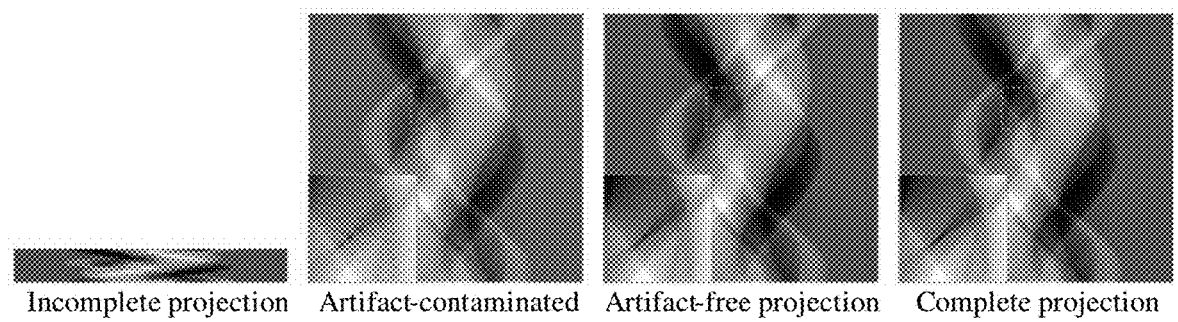
| Incomplete projection sequences | Artifact-contaminated projection sequences | Artifact-free projection sequences | Complete projection sequences |
| --- | --- | --- | --- |
| FIG. 3A | FIG. 3B | FIG. 3C | FIG. 3D |
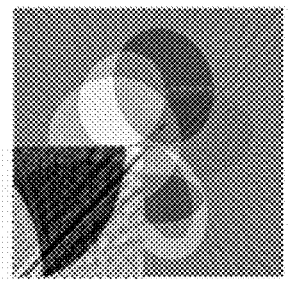
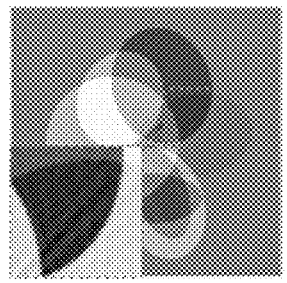
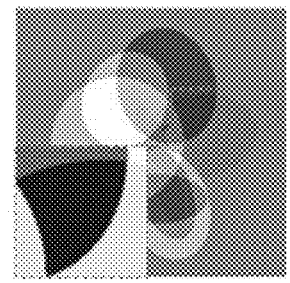
| Initial reconstructed image | Final reconstructed image | Reconstructed image of complete sequences |
| --- | --- | --- |
| FIG. 4A | FIG. 4B | FIG. 4C |

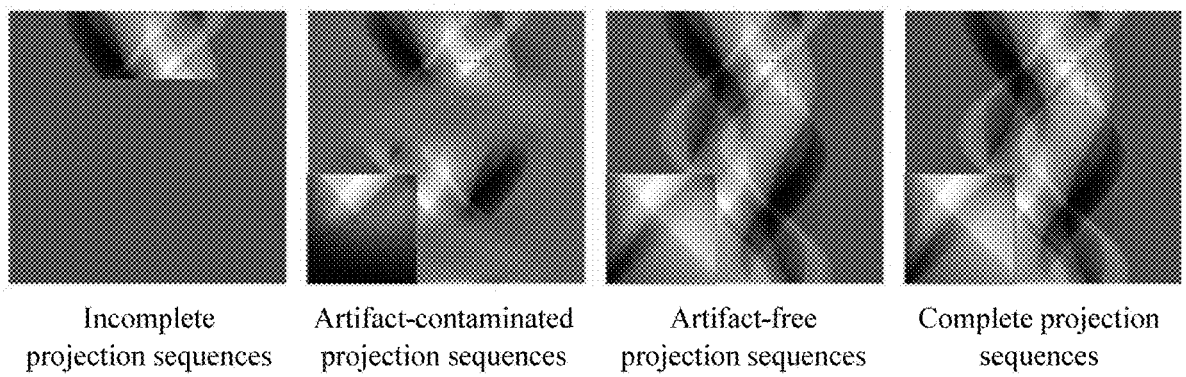
| Incomplete projection sequences | Artifact-contaminated projection sequences | Artifact-free projection sequences | Complete projection sequences |
|---|---|---|---|
| FIG. 5A | FIG. 5B | FIG. 5C | FIG. 5D |
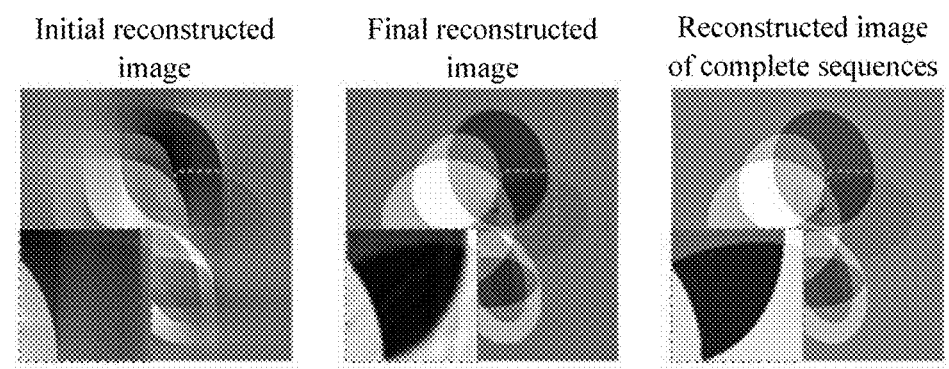
| Initial reconstructed image | Final reconstructed image | Reconstructed image of complete sequences |
|---|---|---|
| FIG. 6A | FIG. 6B | FIG. 6C |

METHOD FOR RECONSTRUCTING INCOMPLETE DATA OF X-RAY ABSORPTION CONTRAST COMPUTED TOMOGRAPHY BASED ON DEEP LEARNING

TECHNICAL FIELD

The present invention relates to the technical field of reconstruction of X-ray absorption contrast computed tomography (CT), in particular to a method for reconstructing X-ray incomplete data based on deep learning (DL).

BACKGROUND

In the X-ray absorption contrast computed tomography (CT) system, the X-ray source emits X-rays to pass through a certain area of the detected object from different angles, and the detector placed on the opposite side of the radiation source receives the rays at the corresponding angles. According to the different attenuation of rays at each angle, a certain reconstruction algorithm is used to reconstruct the mapping image of the linear attenuation coefficient distribution of the rays in the scanned area of the object. In this way, the image is reconstructed by projection, and the features of the object such as medium density, composition and structural form are reproduced in a nondestructive way.

Reconstruction algorithms play an important role in the CT imaging system. Among them, filtered back projection (FBP) is a popular algorithm. When it is applied to complete data, FBP has a fast reconstruction speed and high image quality. However, due to the imaging conditions (such as the need to reduce the imaging radiation dose and shorten the imaging time), the data obtained by CT are usually incomplete, and the corresponding FBP reconstruction results have serious artifacts and noise.

The incomplete data reconstruction algorithms include *Algebraic Reconstruction Techniques (ART) for Three-dimensional Electron Microscopy and X-ray Photography*. Gordon et al. Journal of theoretical biology, vol. 29, No. 3, pp: 471-481, 1970 and *Image Reconstruction in Circular Cone-beam Computed Tomography by Constrained, Total-variation Minimization*. Sidky et al. Physics in medicine and biology, vol. 53, No. 17, pp: 4777, 2008. These algorithms obtain better results than FBP, but require a long iterative calculation time and are difficult to select appropriate parameters.

Some scholars have also proposed new reconstruction algorithms in combination with deep learning (DL) technique. For example, Jin et al. proposed *Deep convolutional neural network for inverse problems in imaging*. IEEE transactions on image processing, vol. 26, No. 9, pp: 4509-4522, 2016. This method directly removes artifacts from the reconstructed image. It obtains better reconstruction results than FBP, and has a shorter calculation time than traditional methods. However, the existing DL-based reconstruction methods only post-process the reconstruction result, and do not make full use of all the information obtained by the CT system, resulting in the loss of some details in the processed image, which causes the original image structure to be deformed.

SUMMARY

The present invention provides a method for reconstructing incomplete data of X-ray absorption contrast computed tomography (CT) based on deep learning (DL). The method includes the following steps:

step 1: using a filtered back projection (FBP) algorithm to reconstruct incomplete projection sequences obtained by an X-ray CT system to obtain an initial reconstructed image, where the initial reconstruction image in an initial reconstruction result of FBP includes artifacts and noise due to the incomplete projection sequences;

step 2: using a forward projection operator to forward project the initial reconstructed image to obtain artifact-contaminated complete projection sequences, where the artifact-contaminated complete projection sequences are obtained by forward projecting image structure information and the artifacts into the projection sequences; a number of the sequences is the same as complete data;

step 3: using a DL technique to process the artifact-contaminated complete projection sequences to obtain artifact-free complete projection sequences, where the complete projection sequences obtained by processing the artifact-contaminated complete projection sequences by using the DL technique do not include the artifacts; a number of the sequences is the same as the complete data; and step 4: using the FBP algorithm to reconstruct the artifact-free complete projection sequences to obtain a final reconstructed image.

Further, in step 1, a corresponding FBP algorithm is used to process projection sequences obtained by different differential phase-contrast computed tomography (DPC-CT) systems (parallel beam, fan beam and cone beam). For example, for a fan beam DPC-CT system, the FBP algorithm is:

$$\beta(r, \theta) = \frac{1}{2} \int_0^{2\pi} \frac{1}{U^2} P(\omega, \phi) \frac{D}{\sqrt{D^2 + \omega^2}} * h(\omega) d\phi \quad (1)$$

In the formula, $\beta(r,\theta)$ represents a reconstruction result, $(r, \theta)$ represents polar coordinates, U represents a weight matrix of the imaging system, $P(\omega,\phi)$ represents projection sequences, D represents a distance from a ray source to a rotation center of the imaging system, h represents inverse Fourier transform (IFT) of a filter, $\omega$ represents a position of a detection element on a detector, and $\phi$ represents a rotation angle of the imaging. The initial reconstructed image $\beta(r,\theta)$ is obtained by reconstructing the incomplete projection sequences $P(\omega,\phi)$ according to Formula (1), which includes artifacts and noise.

Further, in step 2, the forward projection operator is expressed by Formula (2):

$$P(\omega,\phi) = \int_{-\infty}^{+\infty} \beta(r,\theta) dl \quad (2)$$

In the formula, $P(\omega,\phi)$ represents the artifact-contaminated complete projection sequences including image structure information and artifacts, the number of the sequences being the same as the complete data; $\beta(r,\theta)$ represents the initial reconstructed image; l represents a projection path.

Further, in step 3, the DL technique uses a convolutional neural network to process the artifact-contaminated complete projection sequences to obtain artifact-free complete projection sequences according to Formulas (3) to (6):

$$\hat{P}(\omega, \phi) = F(\Lambda(f(P(\omega, \phi)))) + P(\omega, \phi) \quad (3)$$

$$f(P(\omega, \phi)) = W^T \cdot P(\omega, \phi) + \text{Bias} \quad (4)$$

$$\text{Error} = \frac{1}{2m}(P(\omega, \phi) - \hat{P}(\omega, \phi))^2 \quad (5)$$

-continued $$\omega_j^{t+1} = \omega_j^t - \eta \cdot \frac{\partial \text{Error}}{\omega_j^t} \quad (6)$$

In the formulas, $\hat{P}(\omega,\phi)$ represents the artifact-free complete projection sequences; f represents an encoding network, which uses the convolutional neural network to extract features from the artifact-contaminated complete projection sequences; $\Lambda$ represents a nonlinear mapping function; F represents a decoding network, which uses the convolutional neural network to analyze the artifact information from high-level features obtained from the encoding; Error represents a learning target of the DL technique in this step to measure a difference between an output value and a true value; W and Bias represent parameters that need to be learned in the convolutional neural network, where the parameters are updated by using a gradient descent algorithm by finding a partial derivative of the learning target to the parameters; $\eta$ represents a learning rate; $\omega j^{t+1}$ represents a learned network parameter.

Further, the encoding network is composed of multi-level convolutional network layers, where the height and width of feature maps in each level are reduced by one time, and the number of corresponding feature maps is doubled. The decoding network is composed of multi-level convolutional neural network layers, where the height and width of feature maps in each level are doubled, and the number of corresponding feature maps is reduced by one time. The feature maps with the same height and width in the encoding network and the decoding network are spliced together to serve as the input feature map of the next-level decoding network.

Further, in step 4, the artifact-free complete projection sequences $\hat{P}(\omega,\phi)$ are reconstructed according to Formula (1) to obtain the final reconstructed image $\beta(r,\theta)$.

Compared with the traditional incomplete data reconstruction methods, the examples of the present invention feature a simpler calculation process, fewer parameters to be manually set, a faster calculation speed and higher image quality.

BRIEF DESCRIPTION OF DRAWINGS

FIG. 2 is a structural diagram of an example of a DL technique of the method for reconstructing incomplete data of X-ray absorption contrast CT based on DL according to an example of the present invention.

FIGS. 3A-3D show projection sequences of sparse-view data, artifact-contaminated projection sequences and artifact-free projection sequences of X-ray incomplete data and complete projection sequences according to an example of the present invention.

FIGS. 4A-4C show an initial reconstruction result and a final reconstruction result of the sparse-view data of the X-ray incomplete data and a reconstructed image of the complete projection sequences according to an example of the present invention.

FIGS. 5A-5D show projection sequences of limited-view data, artifact-contaminated projection sequences and artifact-free projection sequences of the X-ray incomplete data and complete projection sequences according to an example of the present invention.

FIGS. 6A-6C show an initial reconstruction result and a final reconstruction result of the limited-view data of the X-ray incomplete data and a reconstructed image of the complete projection sequences according to an example of the present invention.

Figure 1:
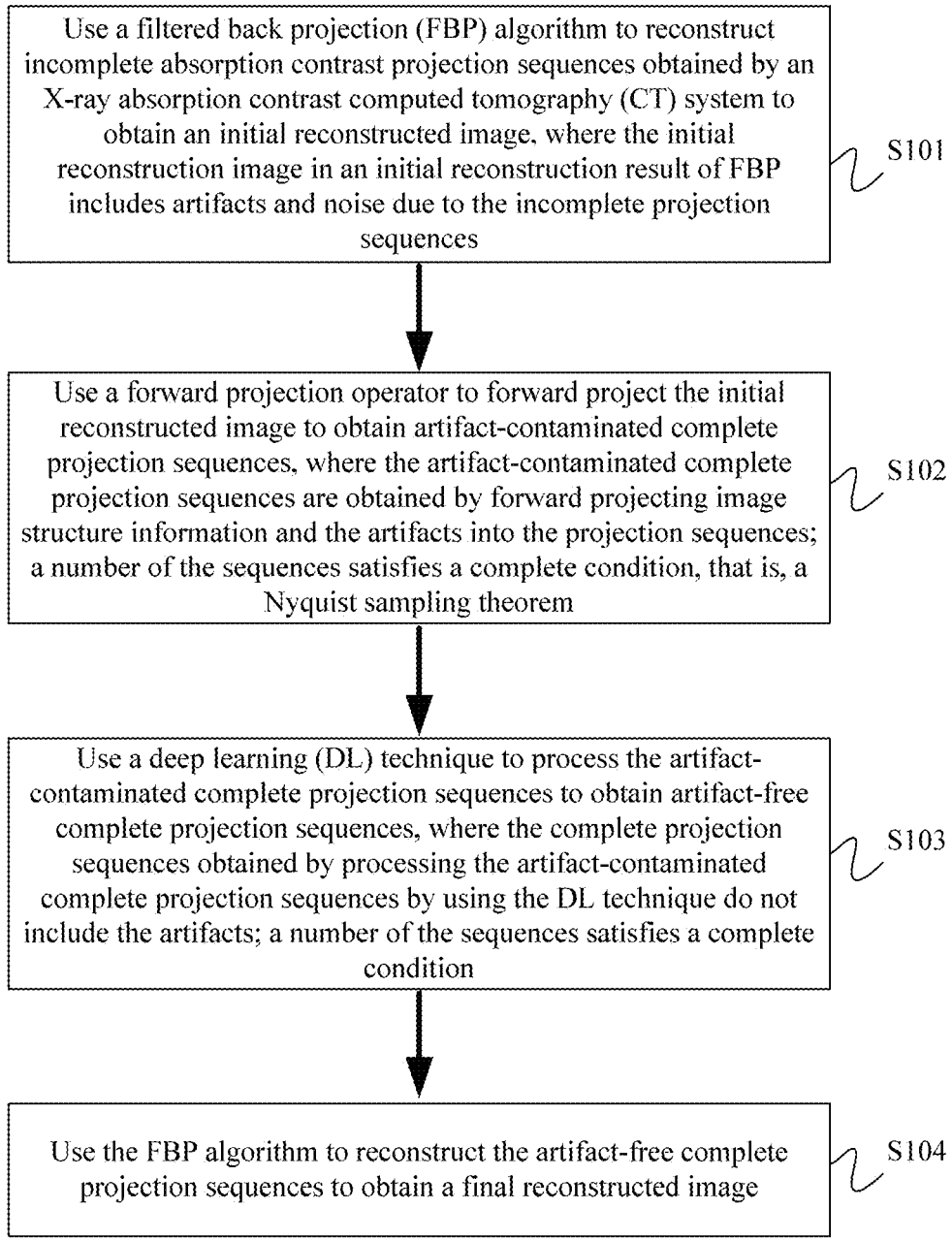
FIG. 1 is a flowchart of a method for reconstructing incomplete data of X-ray absorption contrast computed tomography (CT) based on deep learning (DL) according to an example of the present invention.

REFERENCE NUMERALS 20. artifact-contaminated projection sequence; 21. first-level encoding layer; 22. second-level encoding layer; 23. third-level encoding layer; 24. fourth-level encoding layer; 25. fifth-level encoding layer; 26. first-level decoding layer; 27. second-level decoding layer; 28. third-level decoding layer; 29. fourth-level decoding layer; and 210. artifact-free projection sequence.

DETAILED DESCRIPTION

The present invention is described in further detail below with reference to the accompanying drawings and specific implementations.

FIG. 1 is a flowchart of a method for reconstructing incomplete data of X-ray absorption contrast computed tomography (CT) based on deep learning (DL) according to an example of the present invention. The example of the present invention provides a method for reconstructing common incomplete data (sparse-view and limited-view) of X-ray absorption contrast CT based on DL. The method specifically includes the following steps:

S101: use a filtered back projection (FBP) algorithm to reconstruct incomplete projection sequences obtained by a CT system to obtain an initial reconstructed image, where the initial reconstruction image in an initial reconstruction result of FBP includes artifacts and noise due to the incomplete projection sequences.

S102: use a forward projection operator to forward project the initial reconstructed image to obtain artifact-contaminated complete projection sequences, where the artifact-contaminated complete projection sequences are obtained by projecting image structure information and the artifacts into the projection sequences; a number of the sequences satisfies a complete condition.

S103: use a DL technique to process the artifact-contaminated complete projection sequences to obtain artifact-free complete projection sequences, where the complete projection sequences obtained by processing the artifact-contaminated complete projection sequences by using the DL technique do not include the artifacts; a number of the sequences satisfies a complete condition.

FIG. 2 is a structural diagram of an example of a DL technique of the method for reconstructing incomplete data of X-ray absorption contrast CT based on DL according to an example of the present invention. As shown in FIG. 2, in the example of the present invention, a convolutional neural network is composed of 5-level encoding layers and 4-level decoding layers. The height and width of feature maps in each level of encoding layer are reduced by one time, and the number of corresponding feature maps is doubled. The height and width of feature maps in each level of decoding layer are doubled, and the number of corresponding feature maps is reduced by one time. The feature maps with the same height and width in an encoding network and a decoding network are splicedtogether to serve as the input feature map of the next-level decoding layer.

S104: use the FBP algorithm to reconstruct the artifact-free complete projection sequences to obtain a final reconstructed image.

Compared with the existing methods, the method for reconstructing incomplete data of X-ray absorption contrast CT in the examples of the present invention makes full use of all the information obtained by the CT system and retains the tiny details in the reconstructed image, thereby achieving higher quality of the reconstructed image.

In order to prove the effects of the above examples, experiments were carried out in the following example of the present invention, including:

(1) Set experimental conditions. The experiments included a sparse-view experiment and a limited-view experiment. The sparse-view incomplete data were composed of projections of 90 angles obtained by 360° circumferential scanning, and the limit-view incomplete data were composed of projections of 180 angles obtained by scanning within [0-90°].

(2) Use an FBP algorithm to obtain an initial reconstruction result.

(3) Use a forward projection operator to obtain artifact-contaminated projection sequences.

(4) Process the artifact-contaminated complete projection sequences according to FIG. 2 and Formulas (3) to (6) to obtain artifact-free complete projection sequences.

(5) Use the FBP algorithm to obtain a final reconstruction result.

FIGS. 3A-3D show projection sequences of sparse-view data, artifact-contaminated projection sequences and artifact-free projection sequences of X-ray incomplete data and complete projection sequences according to an example of the present invention. FIGS. 4A-4C show an initial reconstruction result and a final reconstruction result of the sparse-view data of the X-ray incomplete data and a reconstructed result/image of the complete projection sequences according to an example of the present invention. FIGS. 3 and 4 indicate that the method for reconstructing incomplete data of X-ray absorption contrast CT based on DL can effectively process the incomplete sparse-view data.

FIGS. 5A-5D show projection sequences of limited-view data, artifact-contaminated projection sequences and artifact-free projection sequences of the X-ray incomplete data and complete projection sequences according to an example of the present invention. FIGS. 6A-6C show an initial reconstruction result and a final reconstruction result of the limited-view data of the X-ray incomplete data and a reconstructed result/image of the complete projection sequences according to an example of the present invention. FIGS. 5 and 6 indicate that the method for reconstructing incomplete data of X-ray absorption contrast CT based on DL can effectively process the incomplete limited-view data.

Compared with the traditional reconstruction methods of incomplete data, the examples of the present invention feature a simpler calculation process, fewer parameters to be manually set and a faster calculation speed. Compared with the traditional reconstruction methods of incomplete data based on DL, the examples of the present invention use the DL technique to process the artifact-contaminated projection sequences instead of the initial reconstructed image, so that the weighting coefficient in the reconstruction method can be used again to obtain more image details, thereby improving the image quality.

It should be understood that the device and method disclosed by the examples of the present invention can be implemented in other manners. For example, the example of the DL network structure described above is only illustrative. For example, the encoding network and decoding network described only present a logical function division, and there may be other division methods in actual implementation. For example, the learning target and parameter update method in the example of the DL network structure are only intended for simple functional description, and there may be other methods in actual implementation.

Finally, it should be noted that the above examples are merely intended for describing the technical solutions of the present invention, but not for limiting the present invention. Although the present invention is described in detail with reference to the above examples, persons of ordinary skill in the art should understand that they may still make modifications to the technical solutions described in the above examples or make equivalent replacements to some or all technical features thereof, without departing from the scope of the technical solutions of the examples of the present invention.

What is claimed is:

1. A method for reconstructing incomplete data of X-ray absorption contrast computed tomography (CT) based on deep learning (DL), the method comprising:
    a step 1 of using a filtered back projection (FBP) algorithm to reconstruct incomplete absorption contrast projection sequences obtained by an X-ray absorption contrast CT system to obtain an initial reconstructed image, wherein the initial reconstruction image in an initial reconstruction result of FBP comprises artifacts and noise due to the incomplete projection sequences;
    a step 2 of using a forward projection operator to forward project the initial reconstructed image to obtain artifact-contaminated complete projection sequences, wherein the artifact-contaminated complete projection sequences are obtained by forward projecting image structure information and the artifacts into the projection sequences; a number of the sequences satisfies a complete condition, that is, a Nyquist sampling theorem;
    a step 3 of using a DL technique to process the artifact-contaminated complete projection sequences to obtain artifact-free complete projection sequences, wherein the complete projection sequences obtained by processing the artifact-contaminated complete projection sequences by using the DL technique do not comprise the artifacts; a number of the sequences satisfies a complete condition; and
    a step 4 of using the FBP algorithm to reconstruct the artifact-free complete projection sequences to obtain a final reconstructed image.

2. The method for reconstructing incomplete data of X-ray absorption contrast CT based on DL according to claim 1, wherein
    the incomplete projection sequences are incomplete data generated as a result of various imaging condition restrictions or special needs, and comprise sparse-view data and limited-view data.

3. The method for reconstructing incomplete data of X-ray absorption contrast CT based on DL according to claim 1, wherein
    in step 1, the FBP algorithm that is used to generate the initial reconstructed image is expressed by Formula (1):

$$\beta(r, \theta) = \frac{1}{2} \int_0^{2\pi} \frac{1}{U^2} P(\omega, \phi) \frac{D}{\sqrt{D^2 + \omega^2}} * h(\omega) d\phi \quad (1)$$

wherein, $\beta(r,\theta)$ represents a reconstruction result, $(r,\theta)$ represents polar coordinates, U represents a weight matrix of the imaging system, $P(\omega,\phi)$ represents projection sequences, D represents a distance from a ray source to a rotation center of the imaging system, h represents inverse Fourier transform (IFT) of a filter, ω represents a position of a detection element on a detector, and ϕ represents a rotation angle of the imaging.

4. The method for reconstructing incomplete data of X-ray absorption contrast CT based on DL according to claim 1, wherein
in step 2, the forward operator that is used to process the initial reconstructed image to produce a projection is expressed by Formula (2):

$$P(\omega,\phi) = \int_{-\infty}^{+\infty} \beta(r,\theta) dl \qquad (2)$$

wherein, $P(\omega,\phi)$ represents the artifact-contaminated complete projection sequences comprising image structure information and artifacts, the number of the sequences being the same as the complete data; $\beta(r,\theta)$ represents the initial reconstructed image; l represents a projection path.

5. The method for reconstructing incomplete data of X-ray absorption contrast CT based on DL according to claim 1, wherein
in step 3, the DL technique used to process the artifact-contaminated complete projection sequences to obtain artifact-free complete projection sequences is expressed by Formulas (3) to (6):

$$\hat{P}(\omega, \phi) = F(\Lambda(f(P(\omega, \phi)))) + P(\omega, \phi) \qquad (3)$$

$$f(P(\omega, \phi)) = W^T \cdot P(\omega, \phi) + \text{Bias} \qquad (4)$$

$$\text{Error} = \frac{1}{2m}(P(\omega, \phi) - \hat{P}(\omega, \phi))^2 \qquad (5)$$

$$\omega_j^{t+1} = \omega_j^t - \eta \cdot \frac{\partial \text{Error}}{\omega_j^t} \qquad (6)$$

wherein, $\hat{P}(\omega,\phi)$ represents the artifact-free complete projection sequences; f represents an encoding network, which uses a convolutional neural network to extract features from the artifact-contaminated complete projection sequences $\hat{P}(\omega,\phi)$; Λ represents a nonlinear mapping function; F represents a decoding network, which uses the convolutional neural network to analyze the artifact information from high-level features obtained from the encoding; Error represents a learning target of the DL technique in this step to measure a difference between an output value and a true value; W and Bias represent parameters that need to be learned in the convolutional neural network, wherein the parameters are updated by using a gradient descent algorithm by finding a partial derivative of the learning target to the parameters; η represents a learning rate; $\omega j^{t+1}$ represents a learned network parameter.

6. The method for reconstructing incomplete data of X-ray absorption contrast CT based on DL according to claim 1, wherein
in step 3, the DL technique is used to process the artifact-contaminated complete projection sequences instead of the initial reconstruction result.

* * * * *